United States Patent
Lo

(10) Patent No.: US 8,457,292 B2
(45) Date of Patent: Jun. 4, 2013

(54) BUSY LAMP FIELD SYSTEM FOR REMOTE TELEPHONES AND METHOD FOR THE SAME

(75) Inventor: Che-Sheng Lo, Hsin-Chu (TW)

(73) Assignee: Tecom Co., Ltd., Hsin-Chu (TW)

( * ) Notice: Subject to any disclaimer, the term of this patent is extended or adjusted under 35 U.S.C. 154(b) by 246 days.

(21) Appl. No.: 12/962,704

(22) Filed: Dec. 8, 2010

(65) Prior Publication Data

US 2012/0148039 A1    Jun. 14, 2012

(51) Int. Cl.
*H04M 3/00* (2006.01)
*H04M 3/42* (2006.01)

(52) U.S. Cl.
USPC ..................... 379/207.04; 379/258

(58) Field of Classification Search
USPC ............. 379/216.01, 258, 297; 370/352, 370/353, 354, 355, 356, 357
See application file for complete search history.

(56) References Cited

U.S. PATENT DOCUMENTS

| | | | | |
|---|---|---|---|---|
| 5,117,454 A * | 5/1992 | Yamase | | 379/262 |
| 6,052,461 A * | 4/2000 | Lam | | 379/297 |
| 2003/0123639 A1 * | 7/2003 | Lee | | 379/258 |
| 2003/0154245 A1 * | 8/2003 | Rist et al. | | 709/203 |
| 2003/0215080 A1 * | 11/2003 | Wengrovitz | | 379/219 |
| 2004/0048614 A1 * | 3/2004 | Ham et al. | | 455/433 |
| 2005/0238157 A1 * | 10/2005 | Shaffer et al. | | 379/211.01 |
| 2006/0256773 A1 * | 11/2006 | Hume | | 370/352 |
| 2010/0091766 A1 * | 4/2010 | Lowmaster | | 370/352 |
| 2011/0300900 A1 * | 12/2011 | Fleming et al. | | 455/555 |
| 2012/0027194 A1 * | 2/2012 | Deshpande et al. | | 379/265.01 |

* cited by examiner

*Primary Examiner* — Mohammad Islam
*Assistant Examiner* — Kharye Pope
(74) *Attorney, Agent, or Firm* — Chun-Ming Shih; HDLS IPR Services

(57) ABSTRACT

A busy lamp field (BLF) system for remote telephones and a method for the same are disclosed. The busy lamp field system for remote telephones mainly has a plurality of switchboard systems and a XML server interconnected via the internet. Each switchboard system has a PBX and at least a telephone. Each telephone is connected to the XML server via internet and periodically uploads local phone status. The BLF key of each telephone is set to associate with a corresponding specific remote telephone by a subscriber of each telephone. Each telephone periodically retrieves the phone status of the corresponding remote telephone from the XML server displayed on the BLF key of the local telephone. Thus, a subscriber monitors status of a remote telephone and dials out via each PBX in addition to extension telephone of the local switchboard system.

7 Claims, 3 Drawing Sheets

BUSY LAMP FIELD SYSTEM FOR REMOTE TELEPHONES AND METHOD FOR THE SAME

BACKGROUND OF THE INVENTION

1. Field of the Invention

The present invention generally relates to a telephone, in particular, the present invention relates to a call monitor function of a telephone.

2. Description of Prior Art

Since the invention of the telephone, it has become an indispensable communication means for communication in everyday life. A telephone plays a critical role in everyday life or work.

In an example of making internal calls within a company, switchboard systems were devised in the market for reducing the cost generated by calls among internal staff within a company and facilitate the management of internal telephones of the company. A switchboard system mainly comprises a private branch exchange (PBX) connected with several telephones (referred as extension telephones in the following). When an extension telephone dials out, the call request is sent to a switchboard via the private branch exchange, then the call request is dialed out via the switchboard. One advantage of using the switchboard systems is that the inter calls among each extension telephones are made via the private branch exchange instead of the switchboard; therefore charges paid to the telecom companies for these communications can be saved.

Further, a telephone for the switchboard systems generally has a plurality of Busy Lamp Field (BLF) keys on the housing, where light emitting diodes of the BLF keys flash upon pressing. The BLF keys are set to associate with corresponding specific extension telephones. Subscribers are informed of the current phone status via the BLF keys.

In addition, following setting the BLF key to associate with the corresponding extension telephone, the BLF key can be set as a hot key. Subscribers press the BLF key on the housing, the telephone then autodial out to the extension corresponding telephone and the time spent on dialing by a subscriber is saved.

However, the functions of the BLF keys are applicable to a plurality of extension telephones of the same switchboard system. If the extension telephone associate with a phone number is dialing out via switchboard, the BLF function is not applicable to the extension telephone. Subscribers using other extension telephones are not allowed to monitor the current phone status of the extension telephone. Thus, it is inconvenient and inefficient to subscribers in demand for frequent contacts with international branches and specific important clients, or subscribers having high call volume.

In view of this, it is desirable in the market to provide an innovative BLF monitor function, where telephones can monitor current status of telephones in different switchboard systems in addition to local telephones of the same switchboard system.

SUMMARY OF THE INVENTION

An objective of the present invention is to provide a busy lamp field systems for remote telephones and a method for the same, where subscribers are allowed monitor a telephone in another switchboard system via a BLF key of a telephone in addition to an extension telephone in local switchboard system.

In order to achieve the above objective, the present invention mainly has a plurality of switchboard systems and a XML server interconnected via the internet. Each switchboard system has a private branch exchange and at least a telephone. Each telephone is connected with the XML server via the internet and periodically uploads local phone status. Subscribers of each telephone set BLF keys of a telephone to associate with corresponding specific remote telephones. Each telephone periodically retrieve phone status of corresponding remote telephones from the XML server and display the phone status on the BLF keys on the local telephone.

Compare with prior art, the present invention provides advantages such as enhancing the BLF monitor function to monitor remote telephones in addition to telephones in the local switchboard system. Thus, subscribers may monitor the current telephone status of telephone numbers used by international branches, specific important clients or other frequent business contacts. As a result, subscribers can dial out when the monitored remote telephone is not on line according to the monitor result. Further, subscribers may set BLF keys on the telephone as hot keys to associate with corresponding phone numbers of specific remote telephones. When the BLF key is pressed, the telephone dials out to the phone number. The function is useful in improving business operation efficiency and time saving.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
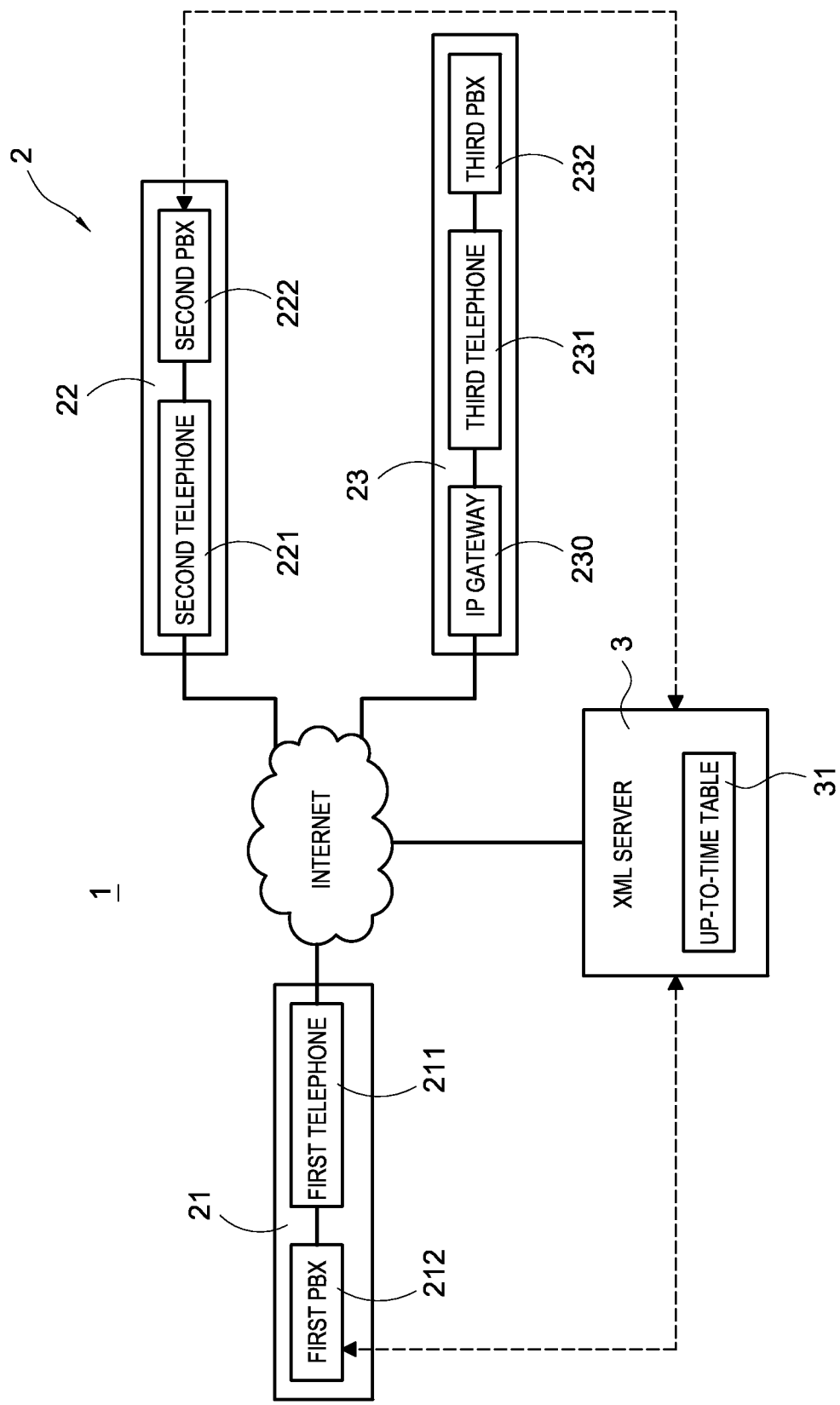
FIG. 1 is a schematic diagram illustrating system architecture according to a preferred embodiment of the present invention.

FIG. 1 is a schematic diagram illustrating system architecture according to a preferred embodiment of the present invention. According to the present invention, a busy lamp field system for remote telephones 1 (referred in the following as the system 1) mainly has a plurality of switchboard systems 2 and an Extensible Markup Language (XML) server 3. Each switchboard system 2 is connected to the internet. The XML server 3 and each switchboard system 2 are interconnected via the internet. The switchboard systems 2 in FIG. 1 are illustrated with examples of a first switchboard system 21, a second switchboard system 22 and a third switchboard system 23 and are not limited to the examples illustrated.

The first switchboard system 21 mainly has a first PBX 211 and a first telephone 212. The second switchboard system 22 has a second PBX 221 and a second telephone 222. As shown in the diagram, the first PBX 211 and the second PBX 221 are illustrated with an example of a VoIP PBX, and the first telephone 212 and the second telephone 222 are illustrated with an example of an IP phone. The telephones 212, 222 dial out via the PBX 211, 221 respectively. The telephones 212, 222 are IP phones which can connect to the internet directly without the PBX 211, 221 for establishing a connection to the XML server 3.

The third switchboard system 23 mainly has a third PBX 231 and a third telephone 232. In addition, the third PBX 231 shown in the FIG. 1 is illustrated with a conventional PBX without networking function. The third telephone 232 is illustrated with a conventional telephone. Accordingly, the third switchboard system 23 also requires a VoIP Gateway 230 connected to the third PBX 231. Thus, the third PBX 231 and the third telephone 232 are connected to the internet via the VoIP Gateway 230 in order to dial out and connect to the XML server 3.

The above embodiment is one of the preferred embodiments according to the present invention. In field applications, each PBX 211, 212, 213 can be a VoIP PBX or conventional PBX, each telephone 212, 222, 223 can be an IP phone or a conventional phone working with a VoIP Gateway for establishing a connection to the internet, and are not limited to the above embodiments.

Each telephone 212, 222, 232 is connected to the XML server 3 via the internet, and periodically uploads local phone status (for example, on idle status, has a coming call, is on a call or off line). The XML server 3 also has an up-to-time table 31. Each telephone 212, 222, 232 periodically uploads and stores local phone status in the up-to-time table 31.

Figure 2:
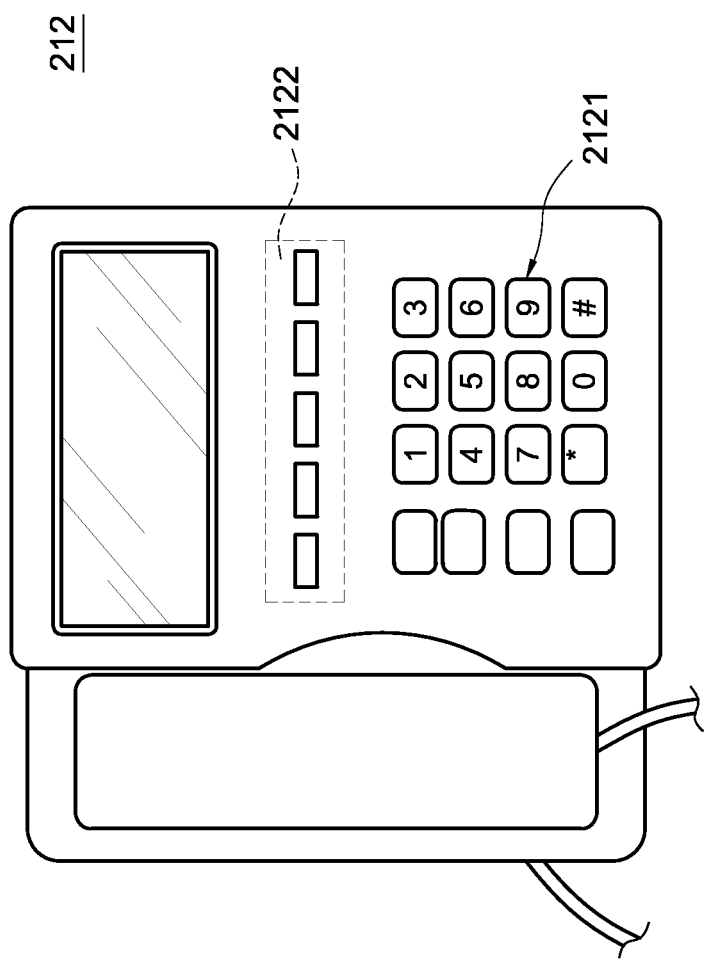
FIG. 2 is a schematic diagram illustrating a telephone according to a preferred embodiment of the present invention.

FIG. 2 is a schematic diagram illustrating a telephone according to a preferred embodiment of the present invention. As shown in the diagram, the first telephone 212 is an illustrating example of the embodiment.

The housing of the first telephone 212 mainly has a plurality of operating keys 2121 and at least a Busy Lamp Field (BLF) key 2122. The BLF key 2122 flashes upon pressing and can be set to associate with corresponding phone number of a remote telephone, wherein the remote telephone is a telephone in another switchboard system.

The subscriber of the first telephone 212 inputs the phone number of the remote telephone with a plurality of operating key 2121 for dialing out to the second telephone 222 via internet. Further, subscriber can set the BLF key 2122 to associate with corresponding phone number of the remote telephone, whereby the local telephone autodials out to the remote telephone after the BLF key 2122 is pressed.

The first telephone 212 connects to the XML server 3 via a network connection, periodically retrieves the phone status of the remote telephone corresponding to the BLF key 2122 in the up-to-time table 31, and displays the phone status on the BLF key 2122. Thus, the first telephone 212 and the remote telephone are not in the same switchboard system, both telephones are allowed to upload and retrieve phone status in the up-to-time table 31 and monitor the phone status of the remote telephone with the BLF key 2122 of the first telephone 212.

In the following embodiment, the first switchboard system 21 is a proximal switchboard system operated by a subscriber, and the first telephone 212 is a proximal telephone. Also, the second switchboard system 22 is a remote switchboard system and the second telephone 222 is a remote telephone.

Figure 3:
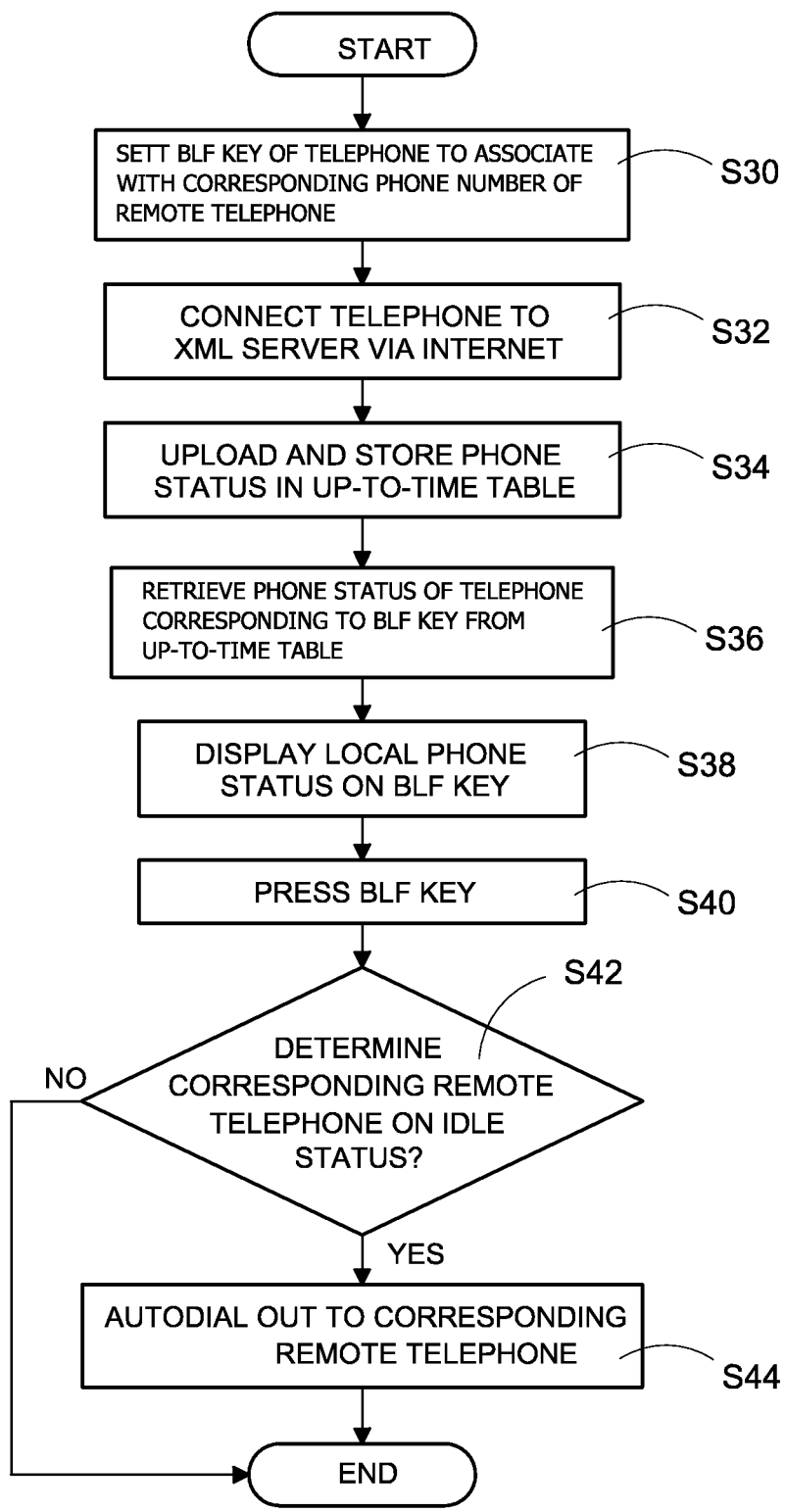
FIG. 3 is a flow chart according to a preferred embodiment of the present invention.

FIG. 3 is a flow chart according to a preferred embodiment of the present invention. First, the BLF key 2122 of the first telephone 212 (i.e. proximal telephone) is set to associate with corresponding phone number of the second telephone 222 (i.e. remote telephones) (step S30). Next, each telephone 212, 222 is connected to the XML server 3 via the internet (step S32). Each telephone 212, 222 periodically uploads the local phone status to the XML server 3, and stores the local phone status in the up-to-time table 31 (step S34). The phone status can be "offline", "on idle status", "coming call" or "busy" etc. The phone status are stored in the up-to-time table 31 and updated periodically.

Next, the first telephone 212 periodically retrieves the phone status of the second telephone 222 corresponding to the BLF key 2122 in the up-to-time table 31 from the XML server 3 (step S36). The phone status of the second telephone 222 corresponding to the BLF key 2122 is replied to the first telephone 212 and displayed on the BLF key 2122 (step S38). For example, when the BLF key 2122 is off, the second telephone 222 is on idle status; when the BLF key 2122 is flashing, the second telephone 222 has a coming call; and when the BLF key 2122 is on, the second telephone 222 is busy.

Thus, the first telephone 212 and the second telephone 222 are in separate switchboard systems, a subscriber is allowed to monitor the phone status of the second telephone 222 via the BLF key 2122 on the first telephone 212. Also, when a subscriber presses the BLF key 2122 (step S40), next, the first telephone 212 determines if the phone status of the second telephone 222 corresponding to the BLF key 2122 is on idle status (step S42). If the second telephone 222 is not on idle status, the first telephone 212 does not dial out; if the step S42 the second telephone 222 is on idle status, the first telephone 212 autodials out to the second telephone 222 corresponding to the BLF key 2122 (step S44). Therefore, the business operation efficiency is effectively improved because the subscriber can save time by dialing out when the remote telephone is on idle status instead of dialing out at random without phone status reference.

As the skilled person will appreciate, various changes and modifications can be made to the described embodiments. It is intended to include all such variations, modifications and equivalents which fall within the scope of the invention, as defined in the accompanying claims.

What is claimed is:

1. A busy lamp field system for remote telephones, comprising:
   a plurality of switchboard systems, each switchboard system comprising:
   a private branch exchange (PBX) connected to the internet; and
   at least a telephone connected to the private branch exchange, the telephone housing having at least a busy lamp field (BLF) key set to associate with corresponding phone number of a remote telephone, wherein the remote telephone is a telephone of another switchboard system;
   an extensible markup language (XML) server connected to each switchboard system via the internet and having an up-to-time table used for storing phone status of each telephone in each switchboard system;
   wherein each telephone is connected, directly without being through the PBX, to the XML server via the internet and periodically uploads to and stores local phone status in the up-to-time table, and each telephone retrieves the phone status of the remote telephone corresponding to the BLF key from the up-to-time table and displays the phone status via the BLF key, and
   wherein a phone number corresponding to the remote telephone is set to associate with the BLF key of the telephone and when the BLF key is pressed and the remote telephone is on idle status, the telephone autodials to the remote telephone.

2. The busy lamp field system for remote telephones of claim 1, wherein the private branch exchange is a VoIP (Voice over Internet Protocol) Private Branch Exchange (IP PBX), the telephone is an IP phone, wherein the telephones is directly connected to the internet for accessing to the up-to-time table in the XML servers.

3. The busy lamp field system for remote telephones of claim 1, wherein each switchboard system further comprises a VoIP (Voice over Internet Protocol) Gateway, the private branch exchange is electrically connected to the VoIP Gateway for connecting to the internet, the telephone is connected to the internet via the private branch exchange and the VoIP Gateway for accessing to the up-to-time table in the XML servers.

4. A method for remote telephones having busy lamp field used among a plurality of switchboard systems, wherein each switchboard system respectively having at least a telephone, the method for remote telephones having busy lamp field comprising:

a) setting a busy lamp field (BLF) key of the telephone set to associate with corresponding phone number of a remote telephone, wherein the remote telephone is a telephone in another switchboard system;

b) connecting each telephone directly, without being through the PBX, to an extensible markup language (XML) server via the internet, wherein a phone number corresponding to the remote telephone is set to associate with the BLF key of the telephone and when the BLF key is ressed and the remote tele shone is on idle status the tele shone autodials to the remote telephone;

c) retrieving the phone status of the remote telephone in the XML server periodically; and d) displaying phone status of the remote telephone via the BLF key of the telephone.

5. The method for remote telephones having busy lamp field of claim 4, wherein in the step d, if the BLF key is off, the remote telephone is on idle status, if the BLF key is flashing, the remote telephone has a coming call, and if the BLF key is on, the remote telephone is busy.

6. The method for remote telephones having busy lamp field of claim 4, wherein the XML server has an up-to-time table and the retrieves the phone status of the remote telephone in the up-to-time table in the step c.

7. The method for remote telephones having busy lamp field of claim 6, wherein the step b further comprises:

e) uploading periodically local phone status to the XML server by each telephone; and f) storing phone status in the up-to-time table.

* * * * *